United States Patent
Draves et al.

(10) Patent No.: US 6,349,355 B1
(45) Date of Patent: Feb. 19, 2002

(54) SHARING EXECUTABLE MODULES BETWEEN USER AND KERNEL THREADS

(75) Inventors: Richard P. Draves, Seattle; Scott Cutshall, Carnation; Gilad Odinak, Bellevue, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/795,591

(22) Filed: Feb. 6, 1997

(51) Int. Cl.[7] .............................................. G06F 12/00
(52) U.S. Cl. .......................................... 711/6; 711/203
(58) Field of Search ............................ 711/6, 203–210, 711/213, 2, 202

(56) References Cited

U.S. PATENT DOCUMENTS

| | | | | |
|---|---|---|---|---|
| 4,774,659 A | * | 9/1988 | Smith et al. ................. | 711/208 |
| 5,835,925 A | * | 11/1998 | Kessler et al. ................. | 711/2 |
| 5,875,487 A | * | 2/1999 | Schwartz et al. ........... | 711/202 |
| 5,940,869 A | * | 8/1999 | Schwartz ..................... | 711/206 |
| 5,956,754 A | * | 9/1999 | Kimmel ....................... | 711/206 |

OTHER PUBLICATIONS

Rashid, Richard et al., "Machine–Independent Virtual Memory Management for Paged Uniprocessor and Multi-processor Architectures," Department of Computer Science, Carnegie Mellon University, 1987.
Bala, Kavita et al., "Software Prefetching and Caching for Translation Lookaside Buffers," MIT Laboratory for Computer Science, Cambridge, MA, date unknown.
King, Adrian, *Inside Windows 95*, Chapter 4, "The Base System," 1994, pp. 103–156.
Yao, "Windows 32–bit api gives developers advanced operating system capabilities", MSJ v6 n6 p15(9), Nov.–Dec. 1991.*
Custer, "design and implementation details of the Windows NT virtual block manager", MSJ v10 n7, p67(13) Jul. 1995.*
Pietrek, "understanding Windows 95 memory management: paging, address spaces and context", MSJ v10 n4 p19(13), Apr. 1995.*
Author unknown, "Overview of the Windows 95 virtual address space layout", MSDN online, Sep. 1995.*
Kath, "The virtual memory manager in Windows NT", MSDN online, Dec. 1992.*
Kath, "Managing memory–mapped files in Win32" MSDN online, Feb. 1993.*
Custer, "Inside Windows NT", Chapters 2,5, and 6, 1993.*

* cited by examiner

*Primary Examiner*—Zarni Maung
(74) *Attorney, Agent, or Firm*—Lee & Hayes, PLLC

(57) ABSTRACT

A computer system has a microprocessor that can execute in a non-privileged user mode and a privileged kernel mode. A user virtual address space is used when the microprocessor is in the user mode, and a kernel virtual address space is used when the microprocessor is in the kernel mode. Each of the address spaces has the same range of virtual addresses that is designated for shared components. The user virtual address space is mapped to an offset position within the kernel address space. When a user process calls a kernel function with a pointer argument, the pointer is biased before being dereferenced to account for the offset of the user address space within the kernel address space. This allows for sharing of position-dependent code, while still allowing the kernel to access the entire user address space.

36 Claims, 12 Drawing Sheets

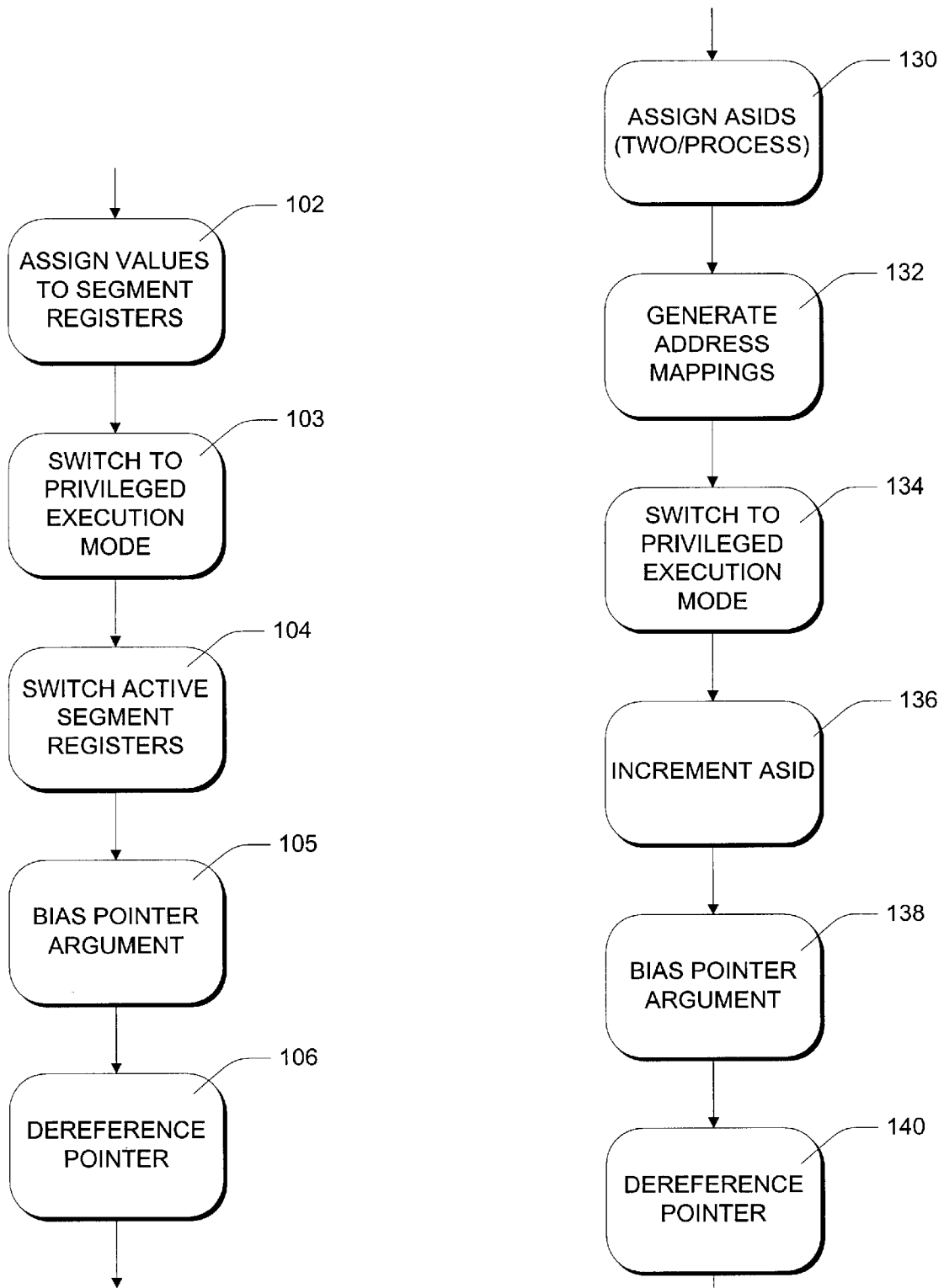

SHARING EXECUTABLE MODULES BETWEEN USER AND KERNEL THREADS

RELATED APPLICATIONS

This application is related to a prior-filed U.S. patent application entitled "Virtual Memory System and Methods," Ser. No. 08/639,773, filed Apr. 29, 1996, now U.S. Pat. No. 5,835,964, which is hereby incorporated by reference.

This application is also related to two applications that are being filed concurrently herewith: an application entitled "Variably-Sized Kernel Memory Stacks," by inventors Richard P. Draves, Scott Cutshall, and Gilad Odinak; and an application entitled "Virtual Memory Scratch Pages," by inventor Richard P. Draves. These applications are also incorporated by reference.

TECHNICAL FIELD

This invention relates to virtual memory systems and techniques in computer systems.

BACKGROUND OF THE INVENTION

It is common for a computer processor and associated operating system to have two different levels of resources and protection. One level, referred to as a non-privileged mode or user mode, is used by various operating system components, application programs, and other so-called "user" processes or programs. At this level, an execution thread is prevented by the operating system and by the computer processor from performing certain security-critical operations. The thread is also prevented from directly accessing many system resources. The purpose of the non-privileged execution mode is to isolate a user process as much as possible so that it cannot interfere with other user processes or with operating system functions. While a user process may itself crash, it should not be able to crash other programs or the operating system.

The other level of execution is referred to as privileged mode, system mode, or kernel mode. Critical operating system components are implemented in kernel mode—kernel-mode components are responsible for things like virtual memory management, responding to interrupts and exceptions, scheduling execution threads, synchronizing the activities of multiple processors, and other critical or sensitive functions. Such components, which execute from system mode, are generally referred to collectively as "the kernel."

The kernel is responsible for supervising the virtual memory system in most computer systems. The virtual memory system is largely responsible for isolating processes from each other. With virtual memory, a process is assigned its own virtual address space, which is not available to other processes. Through its virtual memory, a process has a logical view of memory that does not correspond to the actual layout of physical memory. Each time a process uses a virtual memory address, the virtual memory system translates it into a physical address using a virtual-to-physical address mapping contained in some type of look-up structure and address mapping database.

Rather than attempting to maintain a translation or mapping for each possible virtual address, virtual memory systems divide virtual and physical memory into blocks. In many systems, these blocks are fixed in size and referred to as sections or pages. Data structures are typically maintained in physical memory to translate from virtual page addresses to physical page addresses. These data structures often take the form of conversion tables, normally referred to as page tables. A page table is indexed by virtual page address or number, and generally has a number of entries corresponding to pages in the virtual address space. Each entry is a mapping of a specific page number or virtual page address to a physical page address.

FIG. 1 shows a prior art example of a virtual memory system using a page table. A process generates a virtual address 12. The page number portion of the virtual address (usually the uppermost bits) is used to index a page table 13. The page table, in turn, contains a physical address of a location or page in physical memory 14. In practice, a two-level page table scheme is often implemented, using multiple page tables in at least one of the levels.

FIG. 2 shows an additional level of address conversion available in processors such as the Intel 486 and Pentium Pro® microprocessors. These processors add a segment offset 15 to virtual memory address 12 before indexing the page table. The segment offset can be changed during program execution. In some cases, the segment offset changes automatically during program execution—such as when switching between privileged and non-privileged execution modes. To implement this feature, the microprocessor has sets of offset registers. A designated set is active at each different privilege level of the microprocessor. The different offset registers in each set are used for different types of memory accesses, such as for data memory access and code memory access.

A typical approach to managing computer system memory is to allocate some portion of the memory to the operating system or kernel and another portion for application or user processes. The kernel typically runs in a dedicated or private virtual address space. The kernel or system virtual address space is protected, by processor hardware, from being accessed by any execution thread that is not in the privileged execution mode. Therefore, in practice, the kernel address space consists of a range of virtual addresses that cannot be directly accessed by user processes.

Current micro processors have a 4 gigabyte virtual address space, which is typically divided for use by the kernel and by a user process, respectively. For example, the upper 2 gigabytes of these addresses might be reserved for the kernel, while the lower 2 gigabytes would be available for a user process. Each user process thus has its own 2 gigabyte virtual address space. A user process may conventionally access only the system memory allocated to the user process. The kernel may access both the kernel system memory and the user process system memory.

FIG. 3 shows virtual memory from the view of a user process and from the view of the system or kernel. The user process can use only a range of addresses from 0–2 gigabytes, typically referred to as a user address space. The kernel can access both its private, protected address space at a range of addresses from 2–4 gigabytes (addresses 80000000h to FFFFFFFFh), and the user address space at 0–2 gigabytes (addresses 00000000h to 80000000h).

Note that the kernel effectively has a single address space extending from 0 gigabytes to 4 gigabytes. The user address space appears in or is mapped into the lower 2 gigabytes of this address space, while the kernel executes from the upper 2 gigabytes of this space. The dashed arrow indicates that the kernel address space is mapped to physical memory in such a way that the user address space appears at addresses 00000000h to 80000000h of the kernel address space.

The actual mapping of virtual memory to physical memory is shown in FIG. 4. A user address space 16

(extending from address 00000000h to address 80000000h) is associated with a set of virtual-to-physical mappings 17 (implemented by processor-dependent structures such as page tables and offset registers). These mappings define a region 18 of physical memory for use by a user process.

Similarly, the kernel is located in an address space 19 (extending from address 80000000h to address FFFFFFFFh) that is associated with another set of virtual-to-physical mappings 20. These mappings define a region 21 of physical memory for use by the kernel. Note that the physical address regions are not necessarily contiguous, although they are shown that way in FIG. 4 for purposes of this discussion.

The kernel also has access to an address space 22. This address space is associated with the same virtual-to-physical mappings 17 that are associated with user address space 16, thereby associating physical memory region 18 with address space 22. The result is that user address space 16 (corresponding to physical memory region 18) appears in and can be accessed through address space 22 of the kernel as illustrated in FIG. 3. Thus, the user address space can be described as being mapped into the kernel address space.

When there are a plurality of user processes, each with its own address space, only one of the address spaces is mapped into the kernel address space at any given time. The particular user address space that is mapped into the kernel's address space depends on the current execution context: if the processor is in the context of a user process 1, the corresponding address space of user process 1 is mapped into the kernel's address space; if the processor is in the context of a user process 2, the address space of user process 2 is mapped into the kernel's address space. At each context change, the mapping of the lower 2 gigabytes of the kernel's memory space is changed to the context of the current user process.

It is often necessary for a user process to invoke system or kernel functions. When a user process calls a system function, the computer processor traps the call and switches the current execution thread from user mode to kernel mode. The kernel takes control of the thread, validates the arguments received from the thread and then executes the designated system function. The operating system switches the thread back to user mode before returning control to the user process. In this way, only system functions are allowed to execute from the privileged kernel mode. This protects the kernel and its data from perusal and modification by user processes.

It is an important benefit for the kernel to be able to access a calling process's virtual memory space—it allows a user process to pass data addresses to kernel functions rather than passing data itself. The kernel can use the addresses to read, modify, and write memory in the user process' virtual address space.

There is, however, an important shortcoming of this virtual memory scheme: it does not allow sharing of memory-resident and position-dependent code between user-mode and kernel-mode threads. To illustrate this, FIG. 5 shows a virtual memory space 23 in the context of a user process A. A potentially is shareable program module such as a DLL (dynamic link library) is loaded in a range of virtual memory addresses within the address space of the user process. The DLL includes a code portion 25 that remains static during program execution, and a data portion 26 that changes during execution of the program. FIG. 5 also shows a kernel 24 residing in the upper 2 gigabytes of virtual memory.

Physical memory is referenced in FIG. 5 by numeral 27. An arrow shows that virtual code portion 25 of the DLL is mapped to a specific portion 28 of physical memory 27. Data portion 26 of the DLL is mapped to a different portion 29 of the physical memory. Kernel 24 is also mapped to portions 30 of physical memory. Note that this example is somewhat simplified, showing each memory component mapped to a contiguous block of physical memory. In practice, the various portions of virtual memory are often mapped to a plurality of discontiguous physical memory pages.

In many operating systems such as the Windows NT® operating system, executable code is position-dependent. Code must either be loaded at a specific preferred virtual memory address, or be modified to run at some other virtual memory address. Accordingly, in the example of FIG. 5 the shareable DLL is configured to execute only in the prescribed range of addresses at which it has been loaded.

Now suppose that another user process needs to use the same DLL that the first process has already loaded. This can be accomplished as shown in FIG. 5, which shows a second virtual memory space 31 in the context of a user process B. To be shared, the DLL must be positioned in the virtual address space of application program B at the same place as it has already been positioned in the virtual address space of application program A. Such positioning is reflected in FIG. 5. To implement sharing, the virtual memory portion at which code portion 32 has been positioned maps to the same physical memory 28 that is being used by the code portion 25 of application program A.

User process B needs its own copy of data, however. Thus, the virtual memory portion at which data portion 33 has been positioned maps to a different place 34 in physical memory 27 than that used by data portion 26 of application program A.

Now suppose that a kernel-mode thread needs to use the same DLL, but again needs its own copy of the data portion. Since the DLL is position-dependent, the data portion must be located at a specific virtual memory location. However, this location is within the user process address space rather than within the kernel address space. Specifically, the DLL has been configured so that the data portion must be located in the lower part of virtual memory—the part which is dedicated for use by user processes. While the kernel can access these addresses, doing so for purposes of independently executing the loaded DLL would interfere with the user process. Because of this, it is not possible for the kernel-mode thread to have its own data portion positioned as required by the position-dependent DLL—the data portion needs to be positioned at a specific virtual address range, and in the kernel address space this range maps to a copy of the data portion that already belongs to a user process.

Because of this problem, most operating systems do not allow sharing of executable program modules between kernel-mode threads and user-mode threads. The inventors, however, have discovered a way to allow such sharing while still allowing the kernel to access the full address space of all user processes.

SUMMARY OF THE INVENTION

The invention includes a computer system having both privileged and non-privileged modes of execution. In the non-privileged mode, an executing thread has access to a limited user address space. The kernel executes in the privileged mode from its own address space.

The virtual addresses included in the two respective address spaces are not mutually exclusive. Rather, the ranges of addresses in the two virtual address spaces overlap: the user address space includes a shared address range that coincides with an identical shared address range in the kernel address space. Within both the user address space and the kernel address space, this shared range of addresses is designated for shared executable components.

The kernel address space includes the entire user address space. However, the user address space is not mapped directly into the kernel address space. Rather, the user address space is mapped to an offset position within the kernel virtual address space. This moves the shared address range of the user address space so that it does not necessarily map to the same physical address space as the shared address range of the kernel address space.

To allow user processes to pass valid memory pointers to kernel functions, the operating system biases any such arguments received from user processes before using them. The bias is calculated to account for the offset position of the user address space within the kernel address space.

This scheme allows the kernel to access the entire range of valid user addresses, while also allowing executable components to be shared between user-mode threads and kernel-mode threads.

BRIEF DESCRIPTION OF THE DRAWINGS

FIGS. 15 and 16 are flowcharts illustrating steps performed in the x86 and MIPS embodiments in accordance with the invention.

DETAILED DESCRIPTION OF THE PREFERRED EMBODIMENT

Figure 1:
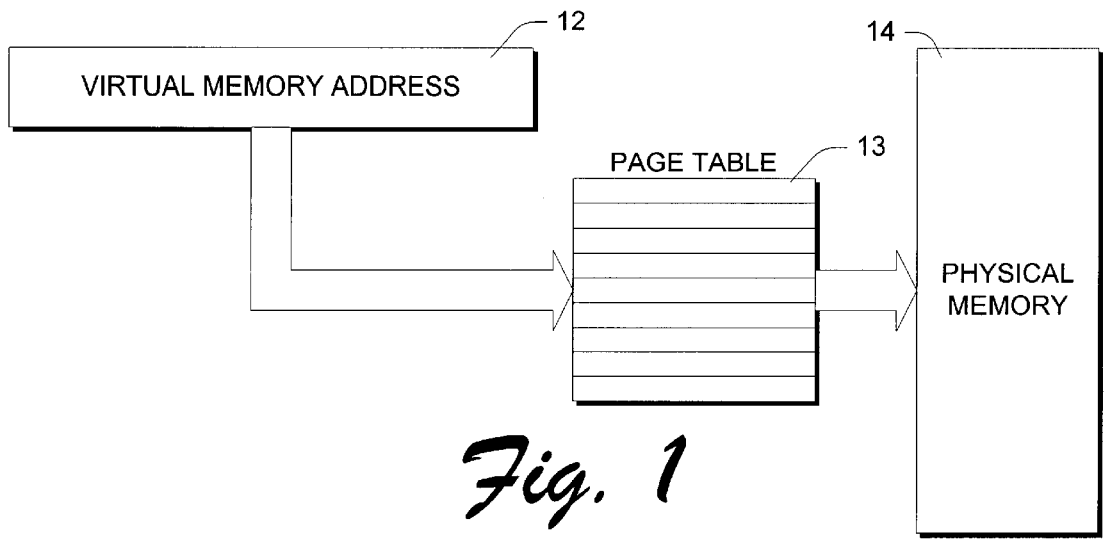
FIG. 1 is a block diagram of a prior art virtual address space utilizing a page table.
Figure 2:
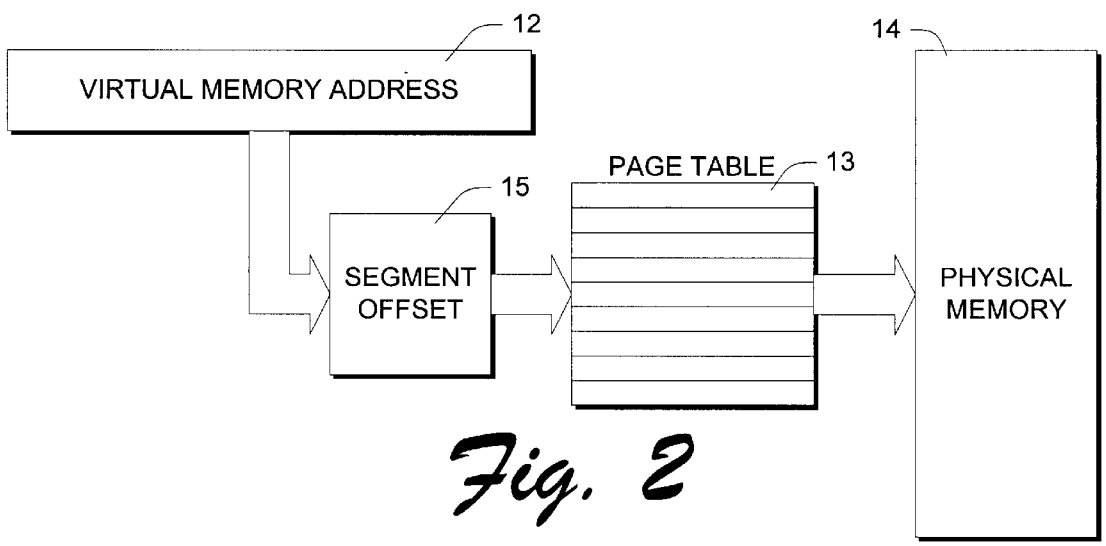
FIG. 2 is a block diagram of a prior art virtual address space utilizing a page table and an segment offset.
Figure 3:
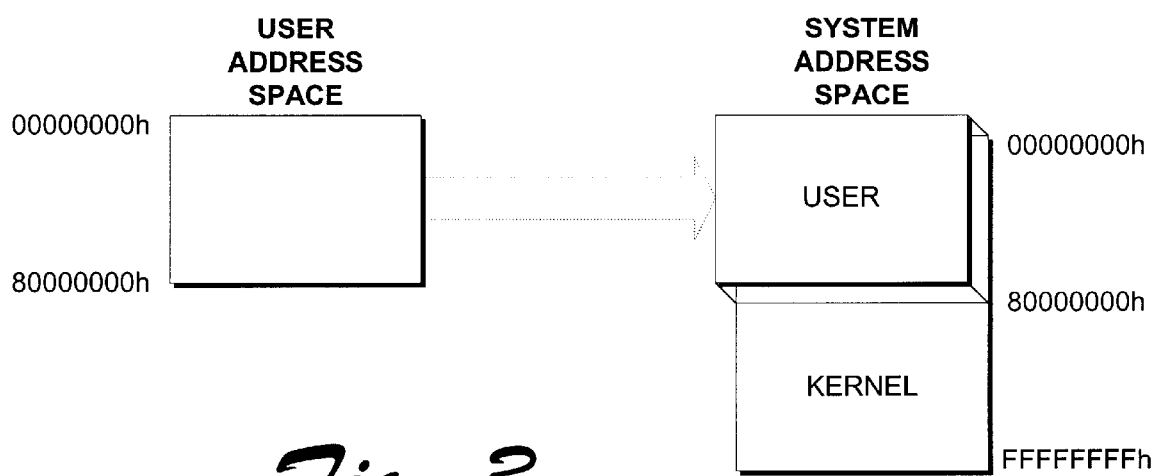
FIG. 3 is a block diagram of a user virtual address space and an associated system or kernel virtual address space.
Figure 4:
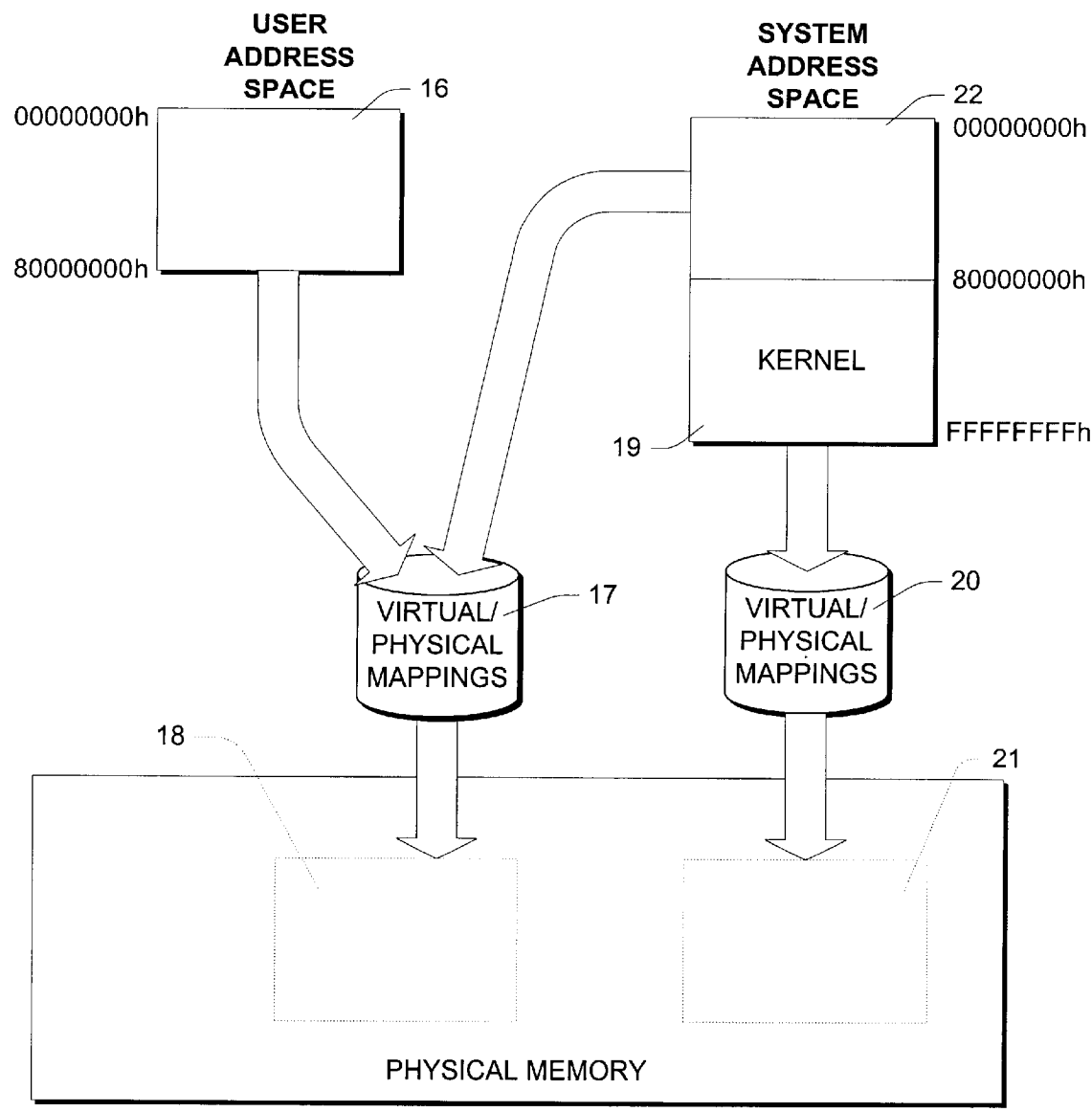
FIG. 4 is a block diagram showing the address spaces of FIG. 3 and their mappings to physical memory.
Figure 5:
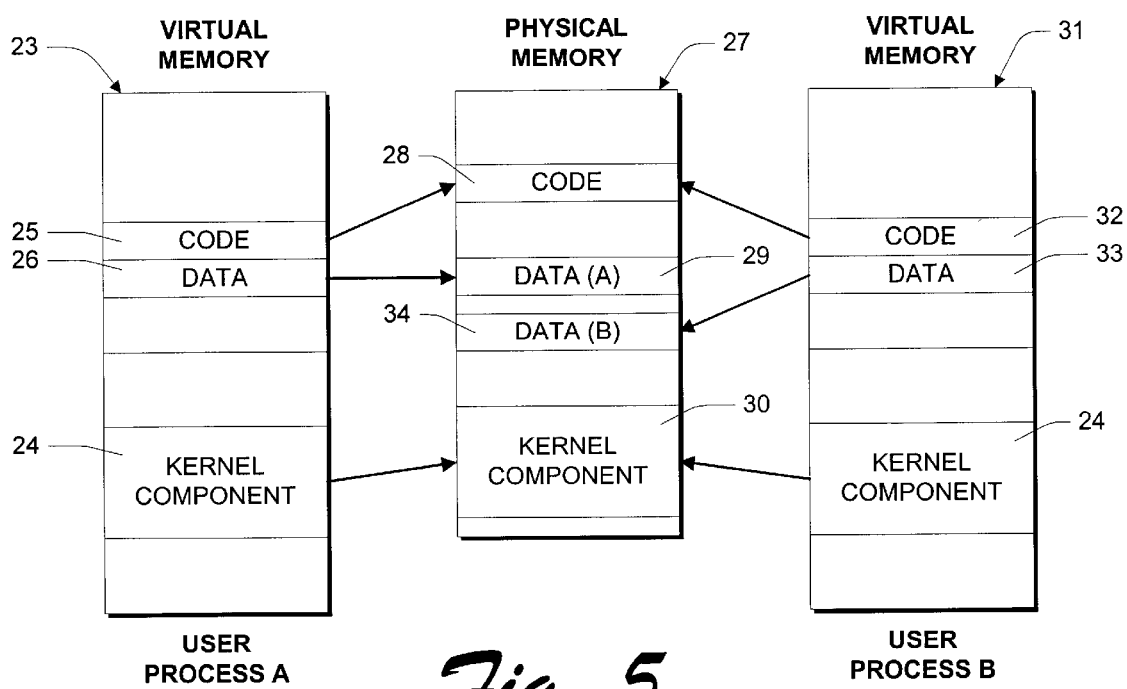
FIG. 5 is a block diagram showing virtual-to-physical address mappings for two user processes that share a position-dependent executable module.
Figure 6:
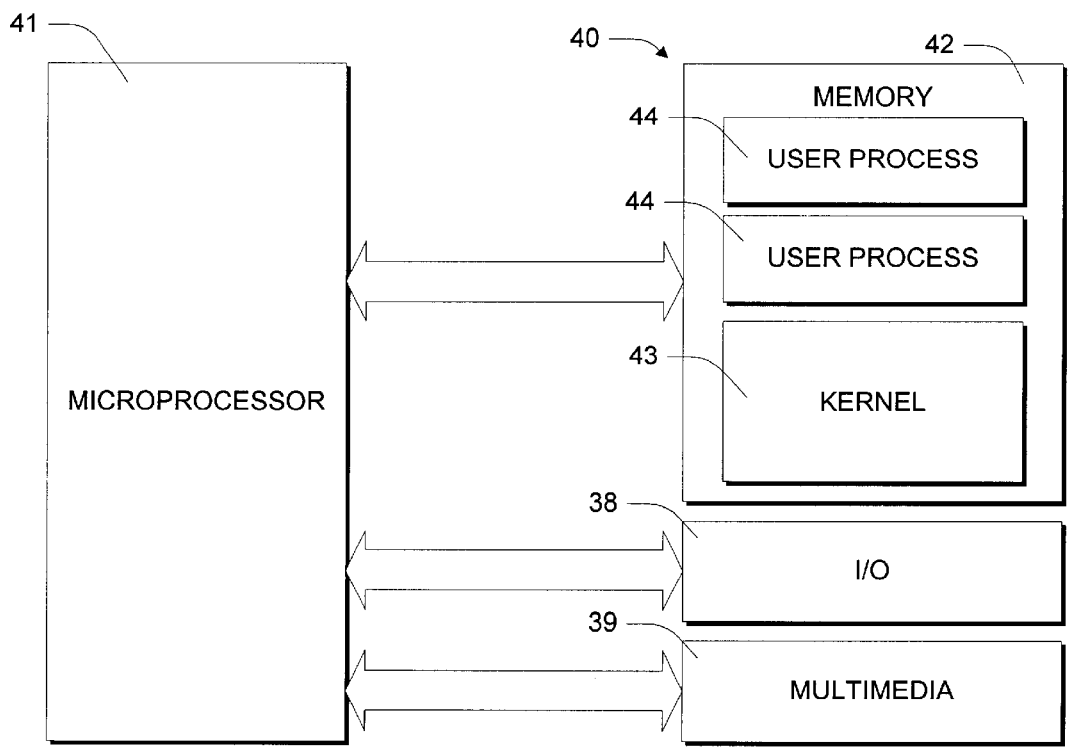
FIG. 6 is a block diagram of a computer system in accordance with the invention.

FIG. 6 shows pertinent hardware components of a computer system in accordance with a preferred embodiment of the invention, generally designated by reference numeral 40. Computer system 40 can be any one of a variety of different types of devices including consumer appliances such as set-top boxes, hand-held or pocket computers, Internet terminals, desktop computers, laptop or notebook computers, server computers, and CD/DVD game players.

Computer system 40 includes a microprocessor 41 and a computer-readable storage medium such as electronic memory 42. Although FIG. 6 shows only a single processor, the system might include a plurality of processors, used by a plurality of different processes or tasks, each having one or more execution threads. The terms task and process as used in this description refer to executing entities within a computer system having their own virtual address spaces. Computer system 40 also includes other typical computer hardware, such as I/O component 38 including interface electronics, as well as multimedia rendering devices 39 such as audio and video components.

Physical memory 42 preferably comprises randomly accessible read/write electronic memory (RAM). In a memory paging system, memory 42 might also include secondary storage such as a magnetic hard disk or other data recording media. Memory 42 might also include other types of computer-readable storage media on which executable components are distributed and stored, including floppy disks, CD-ROMs, and non-volatile electronic memory such as EPROMs.

Processor 41 is a conventional, off-the-shelf microprocessor such as a R3000 microprocessor, manufactured by MIPS Technologies of Mountain View, Calif., or an x86 series microprocessor, manufactured by Intel Corporation of Santa Clara, Calif. It has internal logic for implementing a virtual memory system. Other processors could also be used to implement the invention.

In accordance with conventional computer systems, computer system 40 includes an operating system and one or more application programs that execute in conjunction with the operating system. FIG. 6 shows a portion 43 of the operating system referred to as the kernel, and a single application or user process 44. Although only one user process is shown, a plurality of user processes typically execute from memory 42.

Processor 41 has privileged and non-privileged execution modes as explained above. User processes run in the non-privileged execution mode, and make calls to system or kernel functions that execute in the privileged execution mode.

Figure 7:
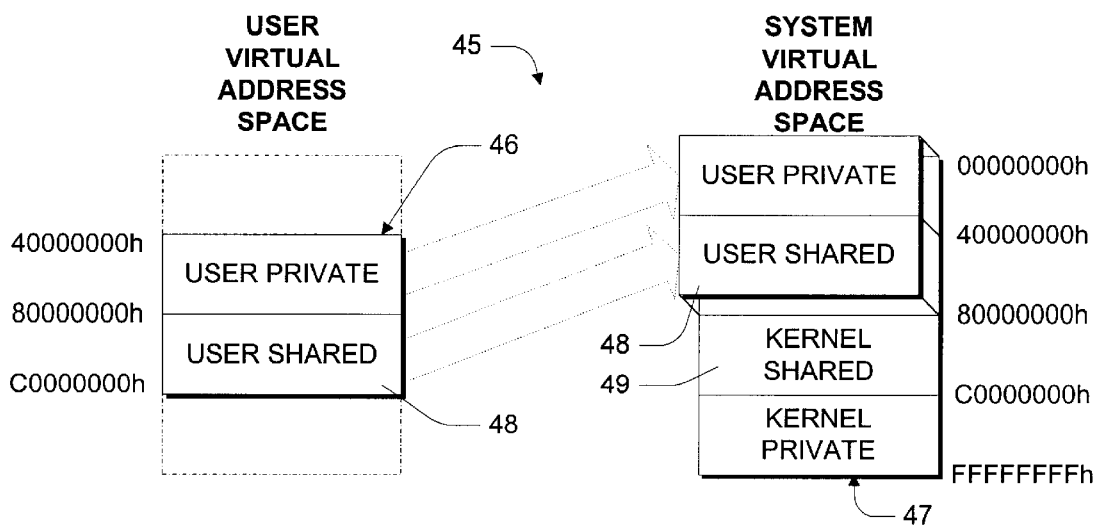
FIGS. 7 and 8 are block diagrams illustrating a virtual memory system in accordance with an exemplary embodiment of the invention.

FIG. 7 shows a virtual memory system 45 that is implemented within computer system 40. Virtual memory system 45 includes a plurality of virtual address spaces. For purposes of explanation, a single user virtual address space 46 is considered in conjunction with a system or kernel virtual address space 47. User virtual address space 46 is used by processor 41 and user process 44 in the non-privileged execution mode. System virtual address space 47 is used by processor 41 and kernel 43 in the privileged execution mode.

In the example of FIG. 7, the user address space is limited to two gigabytes of virtual memory, from virtual addresses 40000000h to C0000000h (where the suffix "h" indicates hexadecimal notation). The kernel address space consists of the entire available four gigabyte virtual memory range, from addresses 0h to FFFFFFFFh, with the user address space mapped into this range as described below. Note that this embodiment is presented primarily to facilitate a general description of the invention that is not limited to any particular microprocessor architecture. Embodiments using specific microprocessors will also be described below.

In contrast to prior art virtual memory systems, in which user processes and the kernel use mutually exclusive ranges of virtual addresses, virtual memory system 45 includes a common range of virtual addresses that is included in both the user virtual address space and the kernel virtual address space. In the example of FIG. 7, for instance, user address space 46 includes a range of addresses 48 in the user address space 46 extending from 80000000h to C0000000h. There is an identical range of addresses 49 in kernel address space 47, again extending from 80000000h to C0000000h. Since the addresses are to locations in virtual memory, virtual addresses within range 48 of the user virtual address space might or might not map to the same physical memory as the same virtual addresses in range 49 of the kernel virtual address space.

For purposes of discussion, the common range of addresses 48 in the user address space 46 is referred to as user "shared" virtual memory, while the common range of addresses 49 in kernel address space 47 is referred to as kernel "shared" virtual memory. The term "shared" does not necessarily refer to shared physical memory, but to the concept of sharing an address range between a user process and the kernel. The remaining portion of the user address space, from 40000000h to 80000000h, is referred to as the user "private" address space, although it is still accessible from the kernel. A portion of the kernel address space from C0000000h to FFFFFFFFh is referred to as the kernel "private" address space. The term "private" is intended simply to differentiate these portions of virtual memory from the "shared" portions of memory. Kernel code and data is positioned primarily in the kernel private address space.

Figure 8:
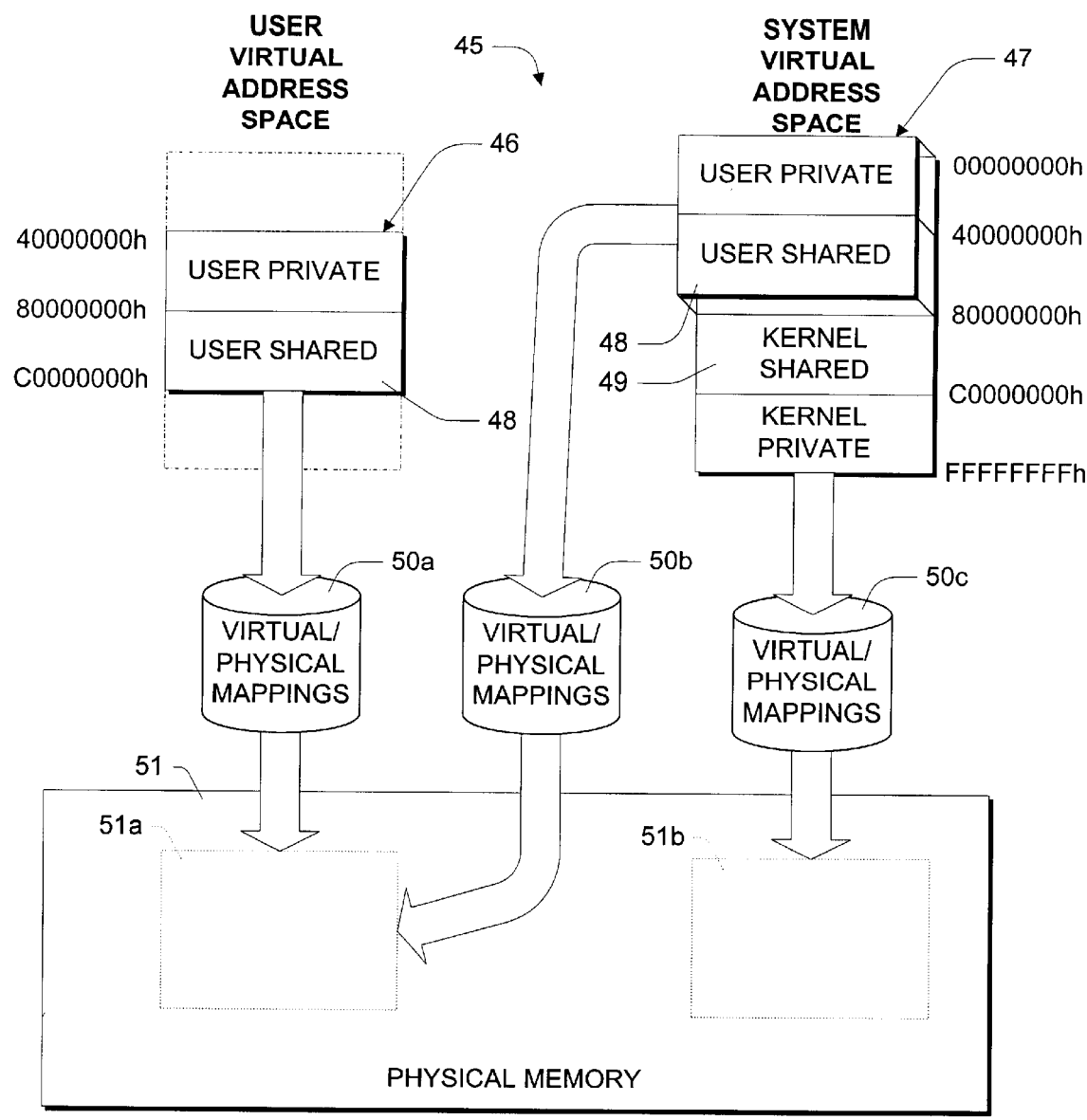

FIG. 8 shows the same virtual memory system 45 as shown in FIG. 7, but also shows the virtual-to-physical address mappings 50 that define the virtual address spaces. The mappings are stored in and accessed from a conventional translation lookaside buffer, page tables, and other structures such as offset registers. Any particular virtual address generated or used by a process is translated before use into a physical address by the virtual-to-physical address mappings. The physical address is used to access physical memory.

As discussed above in the "Background of the Invention" section, calls from a user process to a system function result in a switch from the non-privileged execution mode to the privileged execution mode. In addition, the system function executes from the kernel virtual address space, with the user virtual address space being mapped into the kernel address space to allow the kernel to access data from the user address space. The virtual-to-physical mappings 50 define how the different user address spaces are mapped into the kernel address space. In conventional virtual memory systems, user address spaces are mapped directly into the kernel address space—a range of addresses in a user address space maps into the same range of addresses in the kernel address space.

In the preferred embodiment of the invention, however, the virtual-to-physical mappings 50 map at least part of the user virtual address space into an offset position within the kernel address space. As shown in FIG. 8, virtual-to-physical mappings 50a map user address space 46 to a first portion or portions 51a of physical memory 51. Virtual-to-physical mappings 50c map the upper part of the kernel address space (from 80000000h to FFFFFFFFh) to a second portion or portions 51b of physical memory 51. The lower part of the kernel address space 47 (from 00000000h to 80000000h is mapped by virtual-to-physical mappings 50b to first portion or portions 51a of physical memory 51. Thus, the user address space and the lower portion of the kernel address space map to the same physical memory 51a. However, physical memory 51a is referenced by different virtual addresses, depending on whether it is being accessed by the user process or by the kernel process. From the user process, physical memory 51a corresponds to virtual memory addresses 40000000h to C0000000h. From the kernel, it corresponds to virtual memory addresses 00000000h to 80000000h.

FIG. 7 shows the effect of these mappings: the user virtual address space appears in or is mapped into the system virtual address space at an offset location. Specifically, the user address space extending from 40000000h to C0000000h is mapped into the kernel address range at addresses 0h to 80000000h. Thus, the user virtual address space is offset downwardly in the kernel virtual address space by 40000000h. A virtual address x in the user address space appears at and can be accessed using virtual address x−40000000h in the kernel address space.

The kernel is configured to correct for this offset when receiving pointers or other memory references from a user process. Specifically, function arguments that consist of pointers are biased by the kernel before they are dereferenced by system functions. In this example, each pointer is decremented by 40000000h before it is dereferenced. In the preferred embodiment, kernel calls are first intercepted by a call handler within the kernel. The call handler biases pointer arguments and performs range checking to ensure that such arguments are to valid user memory addresses.

The virtual memory scheme described above allows executable code and program modules to be shared between user processes and kernel functions. This is accomplished by designating the user shared address space 48 and the kernel shared address space 49 for use by shared executable components. The position-dependent program modules are configured to execute from a prescribed virtual address range within the range of virtual addresses designated for shared components, in this case at an address range within the address range of 80000000h to C0000000h. They are then loaded into physical memory and at least portions of them are mapped into the same addresses within both the user virtual address space and the kernel virtual address space.

Figure 9:
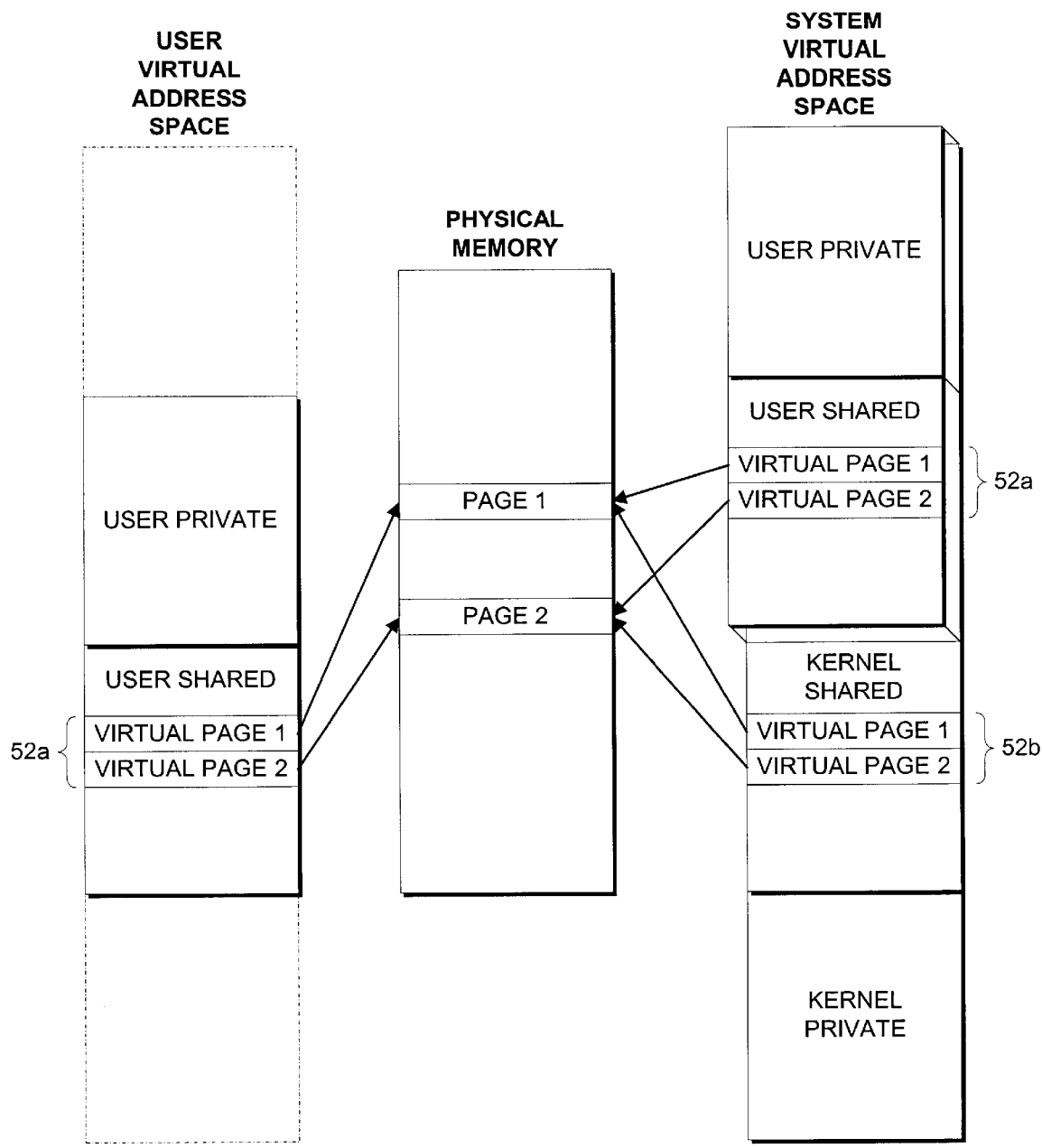
FIGS. 9 and 10 are block diagrams illustrating copy-on-write protection for memory containing a position-dependent executable module.

Refer now to FIG. 9, which shows a user virtual address space, a system virtual address space, and physical memory. Arrows indicate mappings from specific parts of virtual memory to physical memory. These mappings are implemented by processor-dependent structures such as page tables and segment offsets.

Copy-on-write page protection is used to allow a user process and the kernel to access the same memory contents. A position-dependent program module 52a is loaded by the user process in its shared virtual address space. For this example, assume that the program module requires two pages, identified as virtual pages 1 and 2 in FIG. 9. These pages map to two corresponding pages in physical memory. The kernel can use the same program module by simply mapping the same addresses in the kernel shared address space to the same pages of physical memory. The user process and the kernel then share the physical memory as long as neither of them writes to it. This is the situation shown in FIG. 9. The kernel has position-dependent program module 52b, which maps to the same physical memory as position-dependent program module 52a.

If either the user process or the kernel writes to a page, the virtual memory system copies the physical page frame to another location in memory, updates the virtual address space of the user process or the kernel to point to the copy, and then performs the write.

Figure 10:
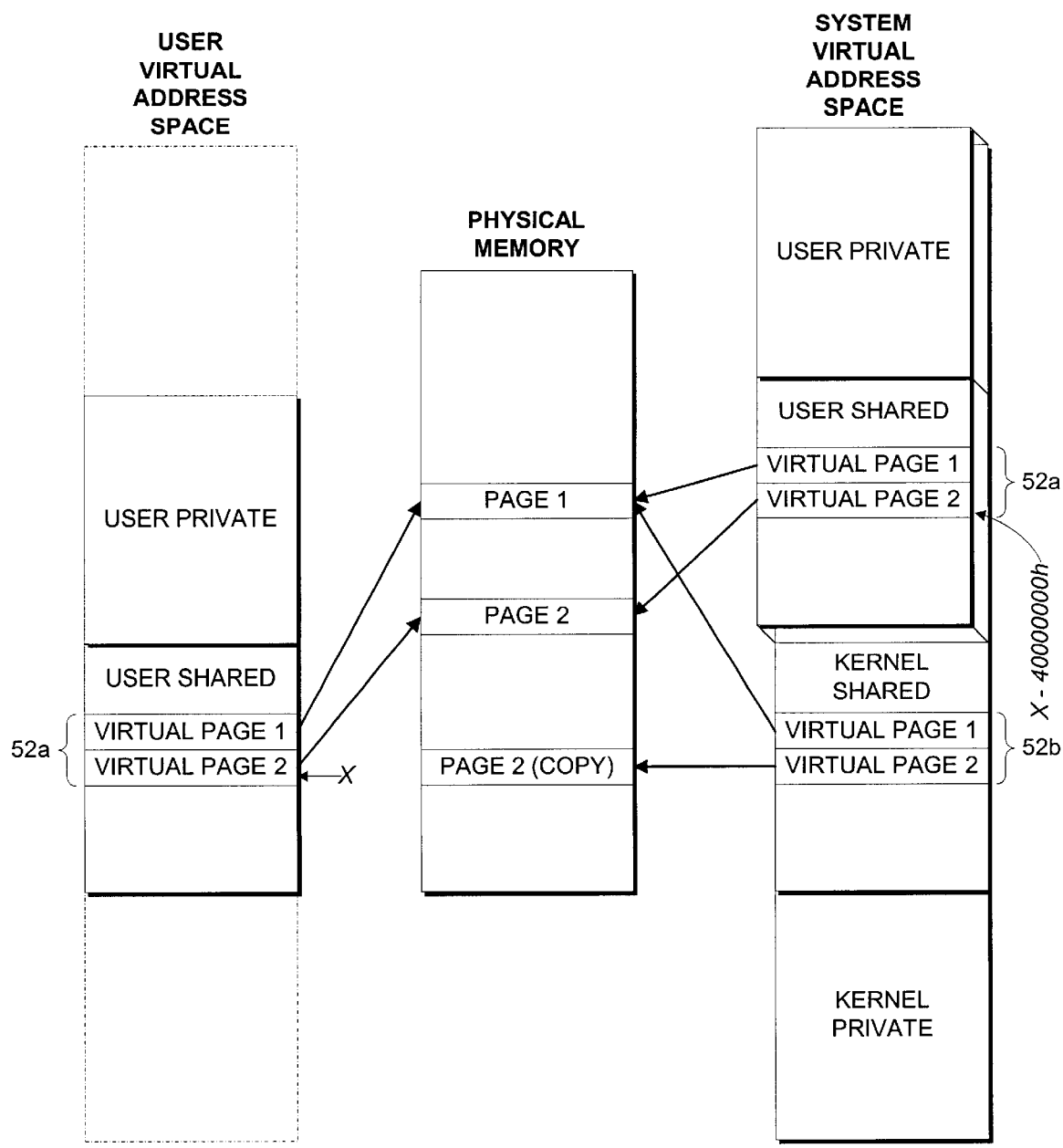

FIG. 10 shows the new mapping after virtual page 2 has been copied. Note that the mapping for the kernel's virtual page 2 has been changed to reference the new copy in physical memory. The user process can write to its original copy of the page without affecting the kernel that is also using its own copy of the page. Similarly, the kernel can write to its copy of the page without affecting the user's copy.

In addition, the user can pass arguments to the kernel referring to the user's copy of page 2. The kernel offsets these arguments and then accesses the user's original copy of page 2. As an example, suppose that the user process passes an address x as an argument, where x is a virtual address within virtual page 2. The kernel offsets this address downwardly by 40000000h, so that it accesses address x–40000000h in the kernel address space. This maps to the original user's copy of page 2, as illustrated in FIG. 10.

Implementing the virtual memory scheme described above presents some challenges in the MIPS and x86 processors. It is desired to shift or offset the address position of the user virtual address space whenever entering the privileged execution mode. However, it is undesirable to perform complex address mapping manipulations at each transition into the privileged execution mode.

Figure 11:
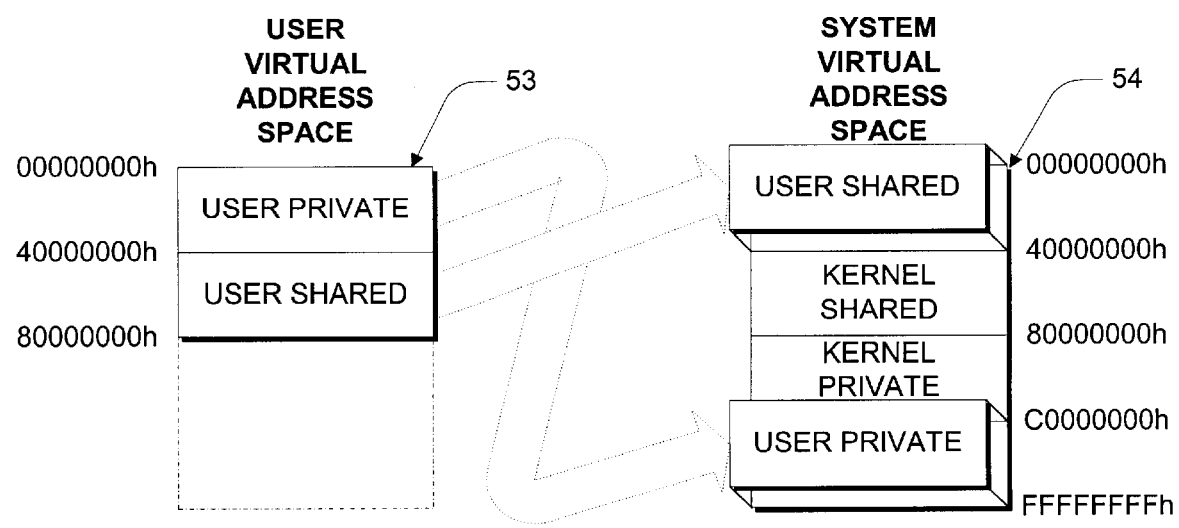
FIG. 11 shows how a user virtual address space is mapped into a system virtual address space in an x86 embodiment of the invention.
Figure 12:
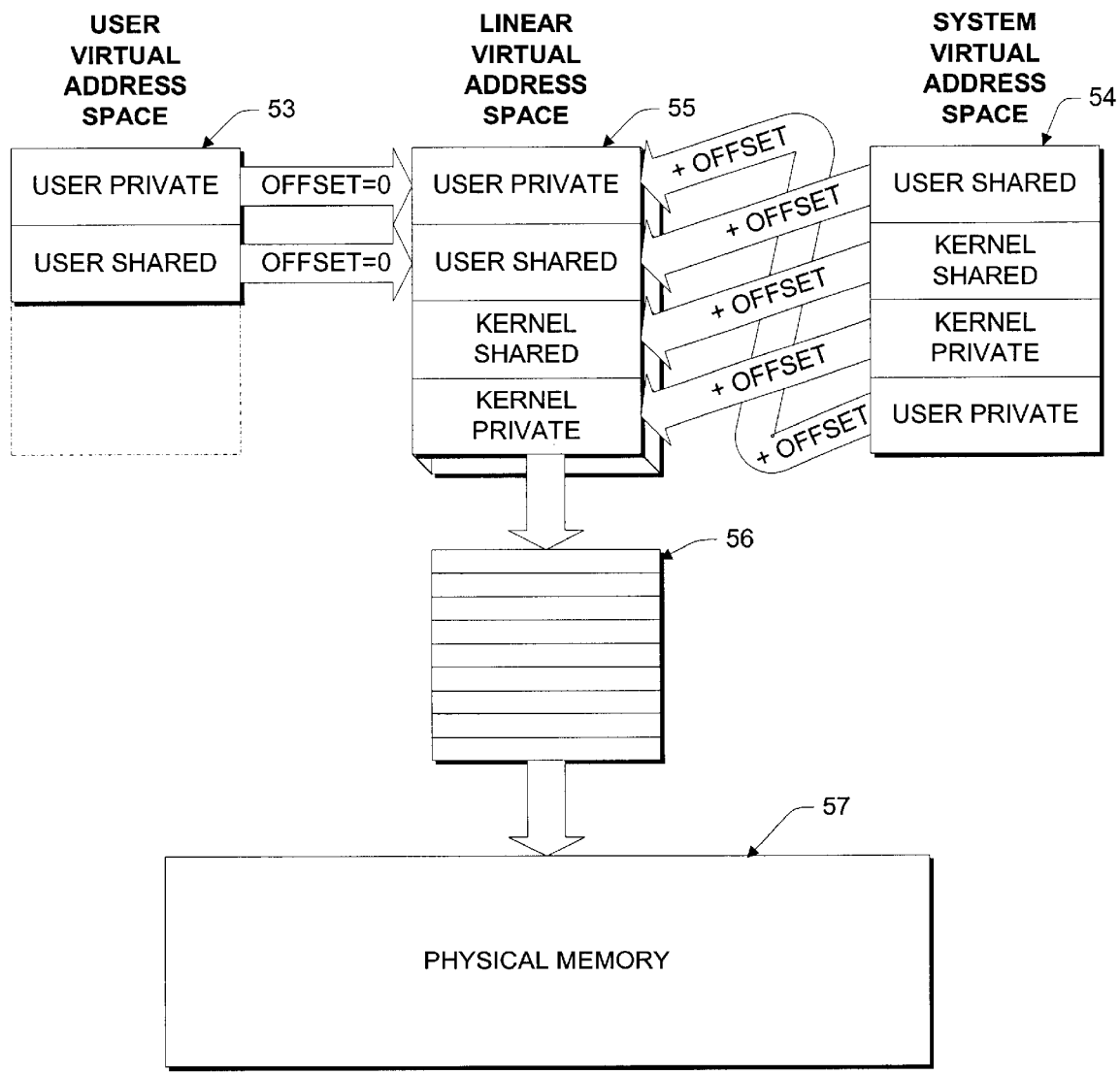
FIG. 12 shows how a user virtual address space and a system virtual address space are mapped into a linear virtual address space and into physical memory in the x86 embodiment of the invention.

FIGS. 11 and 12 illustrate how the virtual memory scheme is implemented in the x86 microprocessor. The x86 uses a segmented addressing scheme as discussed in the Background section above, in which a configurable segment offset is added to each virtual address before the virtual address is translated to a physical address. Segment offsets are maintained in a plurality of segment registers. The microprocessor automatically uses different segment registers when operating in the privileged and non-privileged execution modes, respectively. Accordingly, a first segment offset or set of segment offsets is active in the non-privileged execution mode, and a different segment offset or set of segment offsets is active in the privileged execution mode. As will be explained below, these segment offsets in the preferred embodiment of the invention are configured to have values that differ from each other by at least an amount equal to the length of the range of virtual addresses designated for shared components.

FIG. 11 shows a user address space 53 and a kernel address space 54 as configured under the x86 architecture. The user virtual address space consists of two gigabytes from 0h to 80000000h. Of this, the lower gigabyte is designated as user private virtual memory, while the upper gigabyte, from 40000000h to 80000000h, is designated as user shared virtual memory. The kernel address space consists of the entire four gigabyte available address space. Of this space, the middle two gigabytes are dedicated to the kernel, with the address range 40000000h to 80000000h being designated as kernel shared virtual memory, and the range 80000000h to C0000000h being designated as kernel private virtual memory.

The user virtual address space is mapped into the kernel virtual address space at a negative offset of one gigabyte or 40000000h. Thus, the user shared address space maps into the kernel address space at address range of 0h to 40000000h. The user private address space wraps around to a position in the kernel address space at address range C0000000h to FFFFFFFFh.

FIG. 12 shows how this is implemented. FIG. 12 shows user virtual address space 53 and kernel virtual address space 54, as well as a linear address space 55 resulting from segment offsets in the x86 microprocessor. The linear address space is the virtual address space after accounting for the segment offsets—after the segment offsets have been added to the virtual addresses. Thus, the mappings indicated by the arrows of FIG. 12 are implemented by segment offsets. Addresses from the linear address space are used in turn to index conventional page tables such as the page table 56 shown. Physical addresses, to physical memory 57, are derived from the page tables.

In the non-privileged execution mode (in which the user virtual address space is used) the segment offsets are configured so that the user address space maps directly into the linear address space. However, the segment offsets that are active in the privileged execution mode (in which the kernel virtual address space is used) are configured so that the kernel address space maps at an upward offset into the linear address space. In the privileged execution mode, as reflected by the system virtual address space of FIG. 12, the user shared address space maps into a linear address range of 40000000h to 80000000h. The kernel shared address space maps into a linear address range of 80000000h to C0000000h. The kernel private address space maps into a linear address range of C0000000h to FFFFFFFFh. The user private address space maps into a linear address range of 0h to 40000000h.

To accomplish this mapping, the segment offsets that are active in the non-privileged execution mode are configured to have different values than the segment offsets that are active in the privileged execution mode. More specifically, the segment offsets for the non-privileged execution mode are set to zero, while the segment offsets for the privileged execution mode are set to 40000000h. Virtual addresses above C0000000h in the privileged execution mode wrap around to a base address of 0h. This accomplishes the logical mapping shown in FIG. 11.

The x86 implementation described above is particularly advantageous because it avoids changing the page table base register. Changing the page table base register is an extremely expensive operation in terms of processing cycles.

Figures 13, 14:
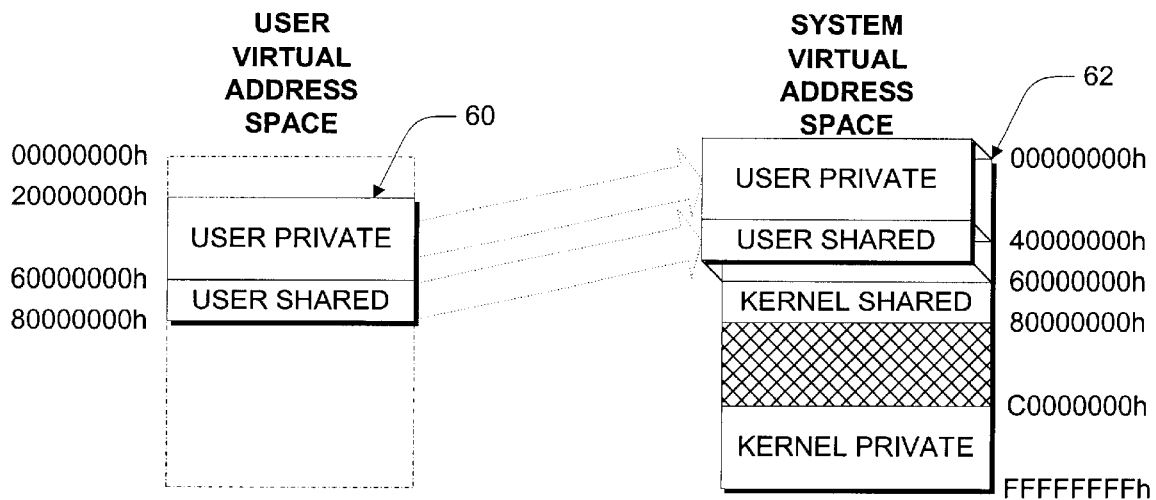
FIG. 13 shows how a user virtual address space is mapped into a system virtual address space in a MIPS embodiment of the invention.
FIG. 14 shows address mappings used in the MIPS embodiment to implement the mapping of FIG. 10.

FIGS. 13 and 14 illustrate how the virtual memory scheme is implemented in the MIPS microprocessor architecture. The MIPS processor reserves a 1 gigabyte range from 80000000h to C0000000h for unmapped kernel memory. This range of addresses cannot be used for virtual memory. Accordingly, the user and kernel virtual address spaces do not include this region.

Referring to FIG. 13, the MIPS implementation includes a user address space 60 and a kernel address space 62. The user virtual address space consists of 1½ gigabytes from address 20000000h to 80000000h. Of this, the lower gigabyte from 20000000h to 60000000h is designated as user private virtual memory, while the upper ½ gigabyte, from 60000000h to 80000000h is designated as user shared virtual memory. The kernel address space consists of the available four gigabyte address space except for the reserved range from 80000000h to C0000000h. Of this space, the upper gigabyte, from C0000000h to FFFFFFFFh, is designated as kernel private memory, and the ½ gigabyte from 60000000h to 80000000h is designated as kernel shared memory.

The user virtual address space appears in or is mapped into the kernel virtual address space at a negative offset of ½ gigabyte or 20000000h. Thus, the user private address space maps into the kernel address space at an address range of 0h to 40000000h. The user shared address space maps into the kernel address space at an address range of 40000000h to 60000000h.

The MIPS processor does not use segmented addressing. Accordingly, another method must be utilized to implement the offset of the user virtual memory space within the kernel virtual memory space.

FIG. 14 shows a simplified TLB 70 (translation lookaside buffer) as used by the MIPS processor. The TLB is a cache that is used to buffer virtual-to-physical mappings from page tables. TLB 70 has a limited number of entries, each defining a virtual-to-physical address mapping for a particular process. Additional entries are stored in page tables or other associated databases which are referenced in response to TLB misses.

Each TLB entry is indexed by an "address space identifier" (ASID) indicating which user address space is described by the entry. An entry also includes a virtual page number and a corresponding physical page number.

The currently active ASID is stored by a processor register. To translate a specified virtual address, the processor examines entries having the currently valid ASID, and then attempts to find an entry matching the specified virtual address. If such an entry is found, the virtual address is translated using the entry. Otherwise, the TLB is updated with the desired entry from the associated databases. TLB entries include a "global" flag ("GLB" in FIG. 14), that overrides the ASID. Entries with the global flag set are used for all processes.

In order to implement the virtual memory scheme of FIG. 14, pairs of virtual-to-physical address mappings or entries are maintained for each user process. This is possible because the MIPS processors uses a software-managed TLB—it calls the kernel for TLB manipulations.

Each pair of virtual-to-physical address mappings includes a first address mapping that is identified by a first ASID, and a second address mapping that is identified by a second ASID. Each pair corresponds to a particular user virtual address page. The first ASID and the first entry of the pair, are used when executing a user process in the non-privileged execution mode; the second ASID, and thus the second entry of the pair, are used when executing the kernel from the privileged execution mode.

More specifically, the system call handler of the virtual memory system is configured to switch between a process' first ASID to its second ASID when switching between the non-privileged execution mode and the privileged execution mode. This results in a corresponding switch between the first and second address mappings for a process.

Exemplary address mappings are shown in FIG. 14 for a user process having first and second ASIDs equal to X and X+1. For purposes of illustration, each process is assigned a consecutive pair of ASIDs, including an odd ASID and an even ASID. A first pair of entries 72 for this process includes one entry for ASID X and another for ASID X+1. X is the ASID used in the non-privileged execution mode, and X+1 is the ASID used in the privileged execution mode. In actual implementation, the upper bit of each ASID is used to distinguish between ASIDs of a pair.

An entry pair such as pair 72 is created for each virtual memory page as it is allocated by the operating system. Pair 72 corresponds to a virtual memory page beginning at address P in the user private virtual address space. The first entry of the pair maps the virtual memory page beginning at address P to a physical memory page beginning at address A1. The second entry of the pair maps to the same physical memory page. However, the virtual memory page in this case is the page beginning at address P−20000000h.

To illustrate how this address mapping pair works, suppose that a user process having ASIDs X and X+1 calls a kernel function with a pointer argument P that is mapped to a physical memory page beginning at address A1. The system call handler intercepts the call and immediately increments the current ASID in the appropriate processor register to change it from X to X+1. It also biases the pointer argument by −20000000h. The kernel function thus receives a pointer having the value P−20000000h. This value is mapped by the second entry of pair 72 to location A1 in physical memory.

Now suppose that there is a position-dependent program module at address S, and that the user process and the kernel need to share this module. When the module is loaded by the user process, an entry pair 74 is created as described above, mapping S and S−20000000h to the physical location A2 of the module. The kernel, however, needs to access the module at its original virtual address S rather than the biased address S−20000000h. Accordingly, an entry 76 is created for ASID X+1. This entry is active only in the privileged execution mode, from the kernel. Entry 76 initially maps address S to the same physical location A2 of the loaded program module. However, copy-on-write protection can be used for this memory, and a copy-on-write fault can cause entry 76 to point to a copy of the program module, residing in physical memory at a location other than A2.

Note that kernel TLB entries for virtual addresses in the kernel private virtual address space can have their global bits set to improve efficiency. Also note that device interrupt handlers and the kernel portions that deal with manipulations of the TLB and associated databases can be configured to access only addresses in the kernel private virtual address space. Accordingly, the ASID does not need to change when executing these routines.

While the invention has been described above primarily in terms of its physical and logical configuration, the invention also includes methodological steps executed by a computer system as well as computer-readable media having instructions for performing such steps in conjunction with a microprocessor or computer. Such steps include, generally:

Using at least a first virtual address space when in the non-privileged execution mode. This address space is commonly referred to as the user address space. It includes a range of virtual addresses that have been designated for shared components.

Using at least a second virtual address space when in the privileged execution mode. This address space is commonly referred to as the system or kernel virtual address space. It includes the same range of virtual addresses that have been designated for shared components, although these addresses in the kernel virtual address space might map to different physical memory locations than they do in the user virtual address space.

Mapping at least part of the user virtual address space to an offset position within the kernel virtual address space. This step preferably comprises offsetting the user virtual address space in the kernel virtual address space by an address offset equal to the length of the range of virtual addresses designated for shared components.

Executing a user process within the user virtual address space in the non-privileged execution mode.

Generating a memory reference to a virtual address in the user virtual address space, and passing the memory reference to a system function from the user process.

Executing the system function within the kernel virtual address space in the privileged execution mode.

Biasing the memory reference to account for the offset position of the first virtual address space within the second virtual address space after passing the memory reference from the user process. This step is preferably performed by a system call handler within the kernel.

Dereferencing the memory reference in the kernel while executing in the privileged execution mode.

These steps allow the kernel to access all of the user virtual address space. Using this scheme, it is also possible to share a position-dependent program module between an execution thread of the user process executing in the non-privileged execution mode, and an execution thread of a system function executing in the privileged execution mode. To execute position-dependent code, the code is configured to execute from a prescribed virtual address range within the range of virtual addresses designated for shared components. Further steps include:

Loading the position-dependent code or program module in physical memory.

Mapping the prescribed virtual address range in the user virtual address space to the physical memory location of position-dependent code. This memory is normally protected using copy-on-write protection.

Mapping the prescribed virtual address range in the kernel virtual address space to the physical memory location of the position-dependent code, also as copy-on-write memory.

Invoking the position-dependent code from the non-privileged user process in the user virtual address space, and also from the privileged kernel function in the kernel virtual address space.

FIG. 12 illustrates more specific steps performed by the kernel in the x86 embodiment of the invention in order to offset the user virtual address space within the kernel virtual address space. A preparatory step 102 comprises assigning different values to the segment registers that are active in the non-privileged and privileged execution modes, respectively. The values differ from each other by at least an amount equal to the length of the range of virtual addresses designated for shared components. Specifically, the segment registers active in the non-privileged execution mode are configured to have an offset of 0 and an upper bound of 2 gigabytes. The segment registers active in the privileged execution mode are configured to have an offset of one gigabyte (40000000h) and an upper bound of 4 gigabytes.

The remaining steps are performed in response to a system call containing a pointer argument. A step 103 comprises switching from the non-privileged execution mode to the privileged execution mode. This step occurs automatically whenever a system call is trapped. A step 104 comprises switching segment addressing modes or registers. This step also occurs automatically, whenever the processor enters the privileged execution mode.

A step 105 comprises biasing the pointer argument by −40000000h. This step is performed by a system call handler before passing the argument on to the called system function. A step 106 comprises dereferencing the biased pointer argument from within the system call. This allows the kernel to access the original memory location referred to by the pointer argument from the user virtual address space.

When returning from the kernel to the user process, the processor switches back to the non-privileged execution mode and reverts to the original segment registers.

FIG. 13 illustrates specific steps performed by the kernel in the MIPS embodiment of the invention in order to offset the user virtual address space within the kernel virtual address space. A step 130 comprises assigning first and second ASIDs to each user process. Another step 132 comprises generating pairs of virtual-to-physical address mappings for each process. A first mapping of each pair is identified by the first ASID, while the second mapping of each pair is identified by the second ASID. The two mappings specify the same physical address. However, the virtual address specified by the first mapping corresponds to a virtual page allocated within the user virtual memory space. The virtual address specified by the second mapping corresponds to a virtual page located ½ gigabyte below the virtual page allocated within the user virtual memory space.

Subsequent steps, performed in response to a system call containing a pointer argument, include a step 134 of switching from the non-privileged execution mode to the privileged execution mode. Again, this occurs automatically when the system call is trapped. A step 136 comprises switching the value of the active ASID. This preferably comprises incrementing the current ASID by a value of one. This has the effect of switching between the first and second address mappings.

A step 138 comprises biasing the pointer argument by −20000000h. This step is performed by a system call handler before passing the argument on to the called system function. A step 140 comprises dereferencing the biased pointer argument from within the system call. This allows the kernel to access the original memory location referred to by the pointer argument from the user virtual address spaces.

Before returning to the non-privileged execution mode, the currently active ASID is switched back to its original value.

The invention implementations disclosed above impose very little overhead on a computer device or its operating system. However, the invention allows for position-dependent code to be shared between a user process and kernel functions, while still allowing the kernel to access the full address space of the user process. This is a tremendous advantage in a system where memory is at a premium.

In compliance with the statute, the invention has been described in language more or less specific as to structural, logical, and methodological features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. In a computer system having privileged and non-privileged execution modes, a method comprising the following steps:

using at least a first virtual address space when in the non-privileged execution mode, wherein the first virtual address space includes a range of virtual addresses designated for shared components;

using at least a second virtual address space when in the privileged execution mode, wherein the second virtual address space also includes said range of virtual addresses designated for shared components;

mapping at least part of the first virtual address space to an offset position within the second virtual address space;

generating a memory reference to a virtual address in the first virtual address space;

biasing the memory reference to account for the offset position of the first virtual address space within the second virtual address space before dereferencing the memory reference in the privileged execution mode.

2. A method as recited in claim 1, wherein the mapping step comprises offsetting the first virtual address space by an address offset equal to the length of the range of virtual addresses designated for shared components.

3. A method as recited in claim 1, wherein the computer system has configurable memory segment offsets, at least a first memory segment offset being active in the privileged execution mode and at least a second memory segment being active in the non-privileged execution mode, respectively, the mapping step comprising:

assigning different values to the first and second memory segment offsets.

4. A method as recited in claim 1, wherein the computer system has configurable memory segment offsets, at least a first memory segment offset being active in the privileged execution mode and at least a second memory segment being active in the non-privileged execution mode, respectively, the mapping step comprising:

configuring the first and second memory segment offsets to have values that differ from each other by at least an amount equal to the length of the range of virtual addresses designated for shared components.

5. A method as recited in claim 1, wherein a process in the computer system has a plurality of virtual-to-physical address mappings, each identified by an address space identifier, the mapping step comprising:

assigning first and second address space identifiers to each process;

switching between the first and second address space identifiers of a particular process when switching between the non-privileged execution mode and the privileged execution mode.

6. A method as recited in claim 1, the mapping step comprising:

generating pairs of virtual-to-physical address mappings for each process, each pair including a first address mapping and a second address mapping;

switching between the first and second address mappings for a particular process when switching between the non-privileged execution mode and the privileged execution mode.

7. A method as recited in claim 1, the mapping step comprising:

assigning first and second address space identifiers to each process;

generating pairs of virtual-to-physical address mappings for each process, a first mapping of each pair being identified by the first address space identifier of the process, a second mapping of each pair being identified by the second address space identifier of the process;

switching between the first and second address space identifiers of the process when switching between the non-privileged execution mode and the privileged execution mode.

8. In a computer system having privileged and non-privileged execution modes, a method comprising the following steps:

using at least a first virtual address space when in the non-privileged execution mode, wherein the first virtual address space includes a range of virtual addresses designated for shared components;

using at least a second virtual address space when in the privileged execution mode, wherein the second virtual address space also includes said range of virtual addresses designated for shared components;

mapping at least part of the first virtual address space to an offset position within the second virtual address space;

generating a memory reference to a virtual address in the first virtual address space;

biasing the memory reference to account for the offset position of the first virtual address space within the second virtual address space before dereferencing the memory reference in the privileged execution mode;

loading position-dependent code configured to execute from a prescribed virtual address range within the range of virtual addresses designated for shared components;

mapping the prescribed virtual address range in the first virtual address space to the position-dependent code;

mapping the prescribed virtual address range in the second virtual address space to the position-dependent code;

invoking the position-dependent code in the first virtual address space from the non-privileged execution mode and in the second virtual address space from the privileged execution mode.

9. In a computer system having privileged and non-privileged execution modes, a method comprising the following steps:

using at least a first virtual address space when in the non-privileged execution mode, wherein the first virtual address space includes a range of virtual addresses designated for shared components;

using at least a second virtual address space when in the privileged execution mode, wherein the second virtual address space also includes said range of virtual addresses designated for shared components;

mapping at least part of the first virtual address space to an offset position within the second virtual address space;

generating a memory reference to a virtual address in the first virtual address space;

biasing the memory reference to account for the offset position of the first virtual address space within the second virtual address space before dereferencing the memory reference in the privileged execution mode;

loading a position-dependent program module configured to execute from a prescribed virtual address range within the range of virtual addresses designated for shared components;

mapping the prescribed virtual address range in the first virtual address space to the position-dependent program module as copy-on-write memory;

mapping the prescribed virtual address range in the second virtual address space to the position-dependent program module as copy-on-write memory;

sharing the position-dependent program module between a first execution thread executing in the non-privileged execution mode and a second execution thread executing in the privileged execution mode.

10. In a computer system having privileged and non-privileged execution modes, a method comprising the following steps:

executing a user process within a user virtual address space in the non-privileged execution mode;

designating a range of virtual addresses in the user virtual address space for shared components;

passing a memory reference to a system function from the user process, the system function executing within a system virtual address space in the privileged execution mode, the system virtual address space including said range of virtual addresses designated for shared components, the memory reference being to a location in the user virtual address space;

mapping at least part of the user virtual address space to an offset position within the system virtual address space;

biasing the memory reference to account for the offset position of the user virtual address space within the system virtual address space, the step of biasing being performed after passing the memory reference from the user process;

dereferencing the memory reference in the system function after biasing the memory reference.

11. A method as recited in claim 10, further comprising the following steps:

loading a position-dependent program module at a prescribed virtual address range within the range of virtual addresses designated for shared components;

sharing the position-dependent program module between the user process and the system function.

12. A method as recited in claim 10, wherein the computer system has configurable memory segment offsets, at least a first memory segment offset being active in the privileged execution mode and at least a second memory segment offset being active in the non-privileged execution mode, respectively, the mapping step comprising:

assigning different values to the first and second memory segment offsets.

13. A method as recited in claim 10, wherein the computer system has configurable memory segment offsets, at least a first memory segment offset being active in the privileged execution mode and at least a second memory segment offset being active in the non-privileged execution mode, respectively, the mapping step comprising:

configuring the first and second memory segment offsets to have values that differ from each other by at least an amount equal to the length of the range of virtual addresses designated for shared components.

14. A method as recited in claim 10, the mapping step comprising:

assigning first and second address space identifiers to the user process;

generating pairs of virtual-to-physical address mappings for the user process, a first mapping of each pair being identified by the first address space identifier, a second mapping of each pair being identified by the second address space identifier;

switching from the first address space identifier to the second address space identifier before executing the system function.

15. A method as recited in claim 10, the mapping step comprising:

generating pairs of virtual-to-physical address mappings for the user process, each pair including a first address mapping and a second address mapping;

switching from the first address mappings to the second address mappings before executing the system function.

16. In a computer system having privileged and non-privileged execution modes, a method comprising the following steps:

executing a user process within a user virtual address space in the non-privileged execution mode;

designating a range of virtual addresses in the user virtual address space for shared components;

passing a memory reference to a system function from the user process, the system function executing within a system virtual address space in the privileged execution mode, the system virtual address space including said range of virtual addresses designated for shared components, the memory reference being to a location in the user virtual address space;

mapping at least part of the user virtual address space to an offset position within the system virtual address space;

biasing the memory reference to account for the offset position of the user virtual address space within the system virtual address space, the step of biasing being performed after passing the memory reference from the user process;

dereferencing the memory reference in the system function after biasing the memory reference;

loading position-dependent code configured to execute from a prescribed virtual address range within the range of virtual addresses designated for shared components;

mapping the prescribed virtual address range in the user virtual address space to the position-dependent code;

mapping the prescribed virtual address range in the system virtual address space to the position-dependent code;

invoking the position-dependent code in the user virtual address space and in the system virtual address space.

17. A computer system comprising:

a processor having privileged and non-privileged execution modes;

a virtual memory system that defines a first virtual address space used by the processor in the privileged execution mode and a second virtual address space used by the processor in the non-privileged execution mode, the first and second virtual address spaces having a common range of virtual addresses designated for shared components;

wherein the virtual memory system maps at least part of the first virtual address space into the second virtual address space at an offset position within the second virtual address space;

a process that is executed by the processor, the process generating a memory reference to a virtual address in the first virtual address space, wherein the process provides the memory reference to a system function executing in the privileged execution mode;

wherein the virtual memory system biases the memory reference to account for the offset position of the first virtual address space within the second virtual address space before the system function dereferences the memory reference.

18. A computer system as recited in claim 17, further comprising: a position-dependent program module configured to execute from a prescribed virtual address range within the range of virtual addresses designated for shared components;

at least parts of the position-dependent program module being mapped into both the first and second virtual address spaces at the prescribed virtual address range.

19. A computer system as recited in claim 17, wherein the processor has configurable memory segment offsets, at least a first memory segment offset being active in the privileged execution mode and at least a second memory segment being active in the non-privileged execution mode, respectively, the first and second memory segment offsets being having different values.

20. A computer system as recited in claim 17, wherein the processor has configurable memory segment offsets, at least a first memory segment offset being active in the privileged execution mode and at least a second memory segment being active in the non-privileged execution mode, respectively, the first and second memory segment offsets being configured to have values that differ from each other by at least an amount equal to the length of the range of virtual addresses designated for shared components.

21. A computer system as recited in claim 17, further comprising:
pairs of virtual-to-physical address mappings corresponding to the process, each pair including a first address mapping and a second address mapping;
wherein the virtual memory system switches between the first and second address mappings when switching between the non-privileged execution mode and the privileged execution mode.

22. A computer system as recited in claim 17, further comprising:
pairs of virtual-to-physical address mappings corresponding to the process, a first mapping of each pair being identified by a first address space identifier, a second mapping of each pair being identified by a second address space identifier;
wherein the virtual memory system switches between the first and second address space identifiers when switching between the non-privileged execution mode and the privileged execution mode.

23. In a computer system having privileged and non-privileged execution modes, a virtual memory system comprising:
a plurality of virtual-to-physical address mappings that define a first virtual address space used in the privileged execution mode and a second virtual address space used in the non-privileged execution mode, the first and second virtual address spaces having a common range of virtual addresses designated for shared components;
wherein the virtual-to-physical address mappings map at least part of the first virtual address space into the second virtual address space at an offset position within the second virtual address space.

24. A virtual memory system as recited in claim 23, further comprising configurable memory segment offsets, at least a first memory segment offset being active in the privileged execution mode and at least a second memory segment being active in the non-privileged execution mode, respectively, the first and second memory segment offsets having different values.

25. A virtual memory system as recited in claim 23, further comprising configurable memory segment offsets, at least a first memory segment offset being active in the privileged execution mode and at least a second memory segment being active in the non-privileged execution mode, respectively, the first and second memory segment offsets having values that differ from each other by at least an amount equal to the length of the range of virtual addresses designated for shared components.

26. A virtual memory system as recited in claim 23, further comprising:
pairs of virtual-to-physical address mappings corresponding to a particular process, each pair including a first address mapping and a second address mapping;

the first address mappings being used in the non-privileged execution mode, the second address mappings being used in the privileged execution mode.

27. A virtual memory system as recited in claim 23, further comprising:
pairs of virtual-to-physical address mappings corresponding to a particular process, a first mapping of each pair being identified by a first address space identifier, a second mapping of each pair being identified by a second address space identifier;
the first address space identifier being used in the non-privileged execution mode, the second address space identifier being used in the privileged execution mode.

28. A computer-readable medium having instructions for performing steps in conjunction with a computer having privileged and non-privileged execution modes, the steps comprising:
using at least a first virtual address space when in the non-privileged execution mode, wherein the first virtual address space includes a range of virtual addresses designated for shared components;
using at least a second virtual address space when in the privileged execution mode, wherein the second virtual address space also includes said range of virtual addresses designated for shared components;
mapping at least part of the first virtual address space to an offset position within the second virtual address space;
generating a memory reference to a virtual address in the first virtual address space;
biasing the memory reference to account for the offset position of the first virtual address space within the second virtual address space before dereferencing the memory reference in the privileged execution mode.

29. A computer-readable medium as recited in claim 28, wherein the mapping step comprises offsetting the first virtual address space by an address offset equal to the length of the range of virtual addresses designated for shared components.

30. A computer-readable medium as recited in claim 28, wherein the computer system has configurable memory segment offsets, at least a first memory segment offset being active in the privileged execution mode and at least a second memory segment being active in the non-privileged execution mode, respectively, the mapping step comprising:
assigning different values to the first and second memory segment offsets.

31. A computer-readable medium as recited in claim 28, wherein the computer system has configurable memory segment offsets, at least a first memory segment offset being active in the privileged execution mode and at least a second memory segment being active in the non-privileged execution mode, respectively, the mapping step comprising:
configuring the first and second memory segment offsets to have values that differ from each other by at least an amount equal to the length of the range of virtual addresses designated for shared components.

32. A computer-readable medium as recited in claim 28, wherein a process in the computer system has a plurality of virtual-to-physical address mappings, each identified by an address space identifier, the mapping step comprising:
assigning a first and second address space identifier to each process;
switching between the first and second address space identifiers of a particular process when switching between the non-privileged execution mode and the privileged execution mode.

33. A computer-readable medium as recited in claim 28, the mapping step comprising:

assigning first and second address space identifiers to each process;

generating pairs of virtual-to-physical address mappings for each process, a first mapping of each pair being identified by the first address space identifier for the process, a second mapping of each pair being identified by the second address space identifier for the process;

switching between the first and second address space identifiers of the process when switching between the non-privileged execution mode and the privileged execution mode.

34. A computer-readable medium as recited in claim 28, the mapping step comprising:

generating pairs of virtual-to-physical address mappings for each process, each pair including a first address mapping and a second address mapping;

switching between the first and second address mappings of a particular process when switching between the non-privileged execution mode and the privileged execution mode.

35. A computer-readable medium having instructions for performing steps in conjunction with a computer having privileged and non-privileged execution modes, the steps comprising:

using at least a first virtual address space when in the non-privileged execution mode, wherein the first virtual address space includes a range of virtual addresses designated for shared components;

using at least a second virtual address space when in the privileged execution mode, wherein the second virtual address space also includes said range of virtual addresses designated for shared components;

mapping at least part of the first virtual address space to an offset position within the second virtual address space;

generating a memory reference to a virtual address in the first virtual address space;

biasing the memory reference to account for the offset position of the first virtual address space within the second virtual address space before dereferencing the memory reference in the privileged execution mode;

loading position-dependent code configured to execute from a prescribed virtual address range within the range of virtual addresses designated for shared components;

mapping the prescribed virtual address range in the first virtual address space to the position-dependent code;

mapping the prescribed virtual address range in the second virtual address space to the position-dependent code;

invoking the position-dependent code in the first virtual address space from the non-privileged execution mode and in the second virtual address space from the privileged execution mode.

36. A computer-readable medium having instructions for performing steps in conjunction with a computer having privileged and non-privileged execution modes, the steps comprising:

using at least a first virtual address space when in the non-privileged execution mode, wherein the first virtual address space includes a range of virtual addresses designated for shared components;

using at least a second virtual address space when in the privileged execution mode, wherein the second virtual address space also includes said range of virtual addresses designated for shared components;

mapping at least part of the first virtual address space to an offset position within the second virtual address space;

generating a memory reference to a virtual address in the first virtual address space;

biasing the memory reference to account for the offset position of the first virtual address space within the second virtual address space before dereferencing the memory reference in the privileged execution mode;

loading a position-dependent program module configured to execute from a prescribed virtual address range within the range of virtual addresses designated for shared components;

mapping the prescribed virtual address range in the first virtual address space to the position-dependent program module as copy-on-write memory;

mapping the prescribed virtual address range in the second virtual address space to the position-dependent program modules as copy-on-write memory;

sharing the position-dependent program module between a first execution thread executing in the non-privileged execution mode and a second execution thread executing in the privileged execution mode.

* * * * *

UNITED STATES PATENT AND TRADEMARK OFFICE
CERTIFICATE OF CORRECTION

PATENT NO.    : 6,349,355 B1                                          Page 1 of 1
DATED         : February 19, 2002
INVENTOR(S)   : Draves et al.

It is certified that error appears in the above-identified patent and that said Letters Patent is hereby corrected as shown below:

Column 3,
Line 58, delete "is" after "potentially".

Signed and Sealed this

Eighteenth Day of June, 2002

Attest:

Attesting Officer

JAMES E. ROGAN
Director of the United States Patent and Trademark Office